(No Model.)
D. C. VOSS.
INCANDESCENT LAMP.
No. 521,131. Patented June 5, 1894.
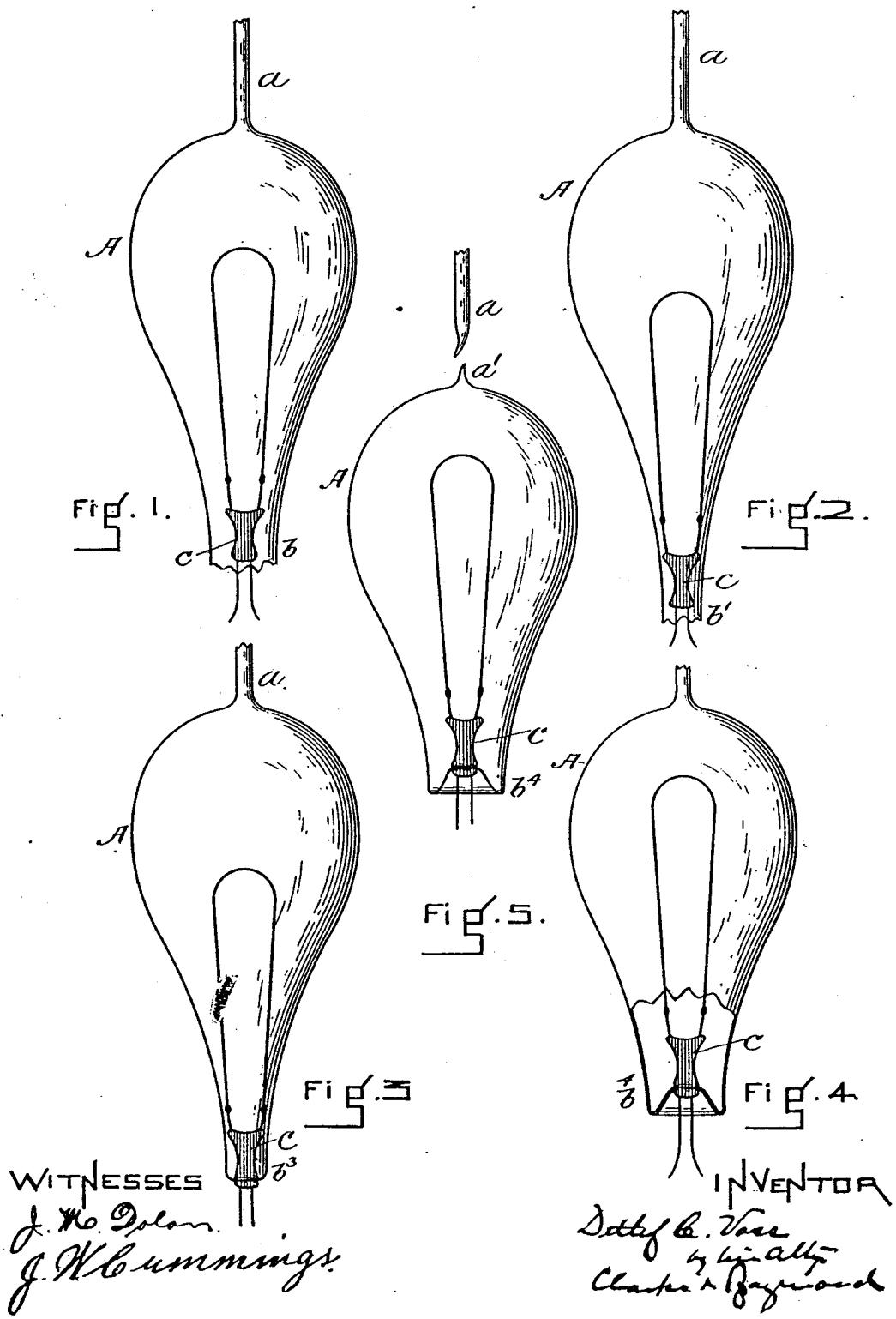

UNITED STATES PATENT OFFICE.

DETLEF CHRISTIAN VOSS, OF BOSTON, MASSACHUSETTS.

INCANDESCENT LAMP.

SPECIFICATION forming part of Letters Patent No. 521,131, dated June 5, 1894.

Application filed November 23, 1893. Serial No. 491,801. (No model.)

*To all whom it may concern:*

Be it known that I, DETLEF CHRISTIAN VOSS, a citizen of the United States, residing at Boston, in the county of Suffolk and State of Massachusetts, have invented a new and useful Improvement in Incandescent Lamps, of which the following, reference being had to the accompanying drawings, is a full, complete, and exact description, sufficient to enable others skilled in the art to make and use my invention without further or other invention on their part.

Before the introduction of the present incandescent lamps which date from somewhere near the close of 1879, and which are characterized by having a carbon filament inclosed in a receiver made entirely of glass and provided with leading-in wires which pass through the glass and are fused therein, to which leading-in wires the carbon filament is attached by its terminals, there was in existence a receiver composed of glass cemented to a metallic base which was not particularly satisfactory and did not keep a good vacuum. It has for many years been thought necessary to have an all glass receiver hermetically sealed, with the leading-in wires of platinum and carried through the substance of the glass.

The series of Nichols patents, No. 238,833 of January 18, 1881, No. 266,187 of October 17, 1882, and No. 268,269 of November 28, 1882, show a departure from the ordinary and usual practice above referred to, by the employment of what is termed a "composition, apparently metallo-vitreous in its nature, being in effect neither metal nor glass, but possessing for certain purposes the properties of both." This composition is described as containing fifty eight per cent. of oxide of lead, it is not stated whether of red lead or of litharge, seventeen per cent. of silica, ten of oxide of iron without stating whether it is of protoxide, sesquioxide or black oxide, ten of oxide of copper, which would not probably be mistaken for anything but the black oxide of copper, and five per cent. of potash of soda. Nichols allows himself a considerable range in selection of ingredients, but prescribes that the cement should be rich in metallic constituents, and at the same time contain sufficient silica to insure perfect adhesion to the glass of the globe. This quotation is from the patent of 1881. In the patent of October, 1882, this metallo-vitreous cement is referred to as the "patented article," and in that of November, 1882, the nature of the cement of "vitreous material" is not particularly referred to.

My invention differs from that disclosed in the Nichols patents, particularly in the nature of the cement, from which I exclude alkalies, and so far as possible, silica, employing only oxides free from silica and high in oxygen, using fifty per cent. of red lead, which is the highest oxide of lead, and is an artificial product free from silica, fifteen per cent. of alumina, which again for this purpose is an artificial product or might be corundum or emery, but must be free from silica, and thirty five per cent. of black oxide of manganese, which indeed is a natural product, but is usually quite free from silica, carrying only a trace.

The fundamental difference therefore, between the Nichols inventions and the present one is the admission of silica and alkalies into the Nichols cement, and their exclusion from my process; and the employment of alumina and black oxide of manganese in my cement, and their absence from any suggestion of the Nichols patents.

I have invented a new and useful form of receiver in which the glass bulb is not continuous, but is closed by a stopper formed of cement which is capable of a close union with glass at a lower temperature than the fusing point of glass and which is of admirable insulating qualities. I make this cement by taking ten parts by weight of red lead, three parts by weight of alumina which must be pure alumina, and therefore I make it from the metal itself by oxidizing metallic aluminum in any well-known practical way, and seven parts of black oxide of manganese. It will be seen that these are all of them oxides high in oxygen. These oxides reduced to fine powder are thoroughly mixed and placed in a Hessian crucible where they are fused; as soon as they are fused, they are poured from the crucible upon a heated iron plate and divided up into rods suitable for manipulation in the same way that the rods provided for glass workers are manipulated.

A plumbago crucible will also serve this purpose and perhaps with more economy than the Hessian, because in order not to rob the crucible of its silica in which the Hessian crucible is rich, it is necessary to pour the fused mixture quite rapidly and not to scrape out the crucible. That which remains in the crucible as it cools down attacks the surface; and if the crucible be used a second time, the result is bad. There is silica in the result. It is of a different color from the material poured from the center and the crucible will usually be destroyed if employed on a second occasion. This is undoubtedly due to that principle that prevails in the making of glass, by which the glass worker feels required to use a considerable quantity of cullet for the manufacture of good glass, the glass not forming perfectly in the first instance, but only after one or two coolings, the rule being, as I understand it, for the best glass two-thirds cullet and one-third batch, although for telescopic glass I am informed all cullet is frequently used. This combination of oxides made as I have described is a true combination of oxides and melts at a lower temperature than the glass of the bulb, and is capable at that temperature only of a surface union with the glass of the bulb. The leading-in wires are made as usual of platinum and have sockets formed upon their inner ends. A rod of the oxide composition hereinafter called cement is taken and the platinum wires being suitably heated are covered separately with a coating of this cement applied hot and forming a plug of circular cross-section suitable to close an orifice in the bulb.

In the drawings there is represented a series of bulbs for an incandescent lamp in process of conversion into the bulb of the present lamp.

Figure 1 represents the bulb with its exhausting tube, and roughly finished neck as it comes from the glass manufacturer. Fig. 2 is the same bulb with its neck after being softened and drawn in to be closed upon the plug of cement, the plug of cement carrying the conducting wires and carbon is inserted in the bulb before any work is done on it, and after the neck has been so drawn as to be nearly ready to close upon the plug, it is drawn out to its place and adjusted. Fig. 3 shows the bulb with its neck contracted around the plug and sealed to it. Fig. 4 shows partly in section the bulb of the next step, in which the neck is folded in upon itself, much like the bottom of a champagne bottle, and with the edges sealed to the cement plug; and Fig. 5 shows in elevation the completed bulb after it has been exhausted and the exhausting tube severed.

A reference to the drawings will show the manner in which this plug is inserted into the bulb; the bulb being formed by blowing, and having its conical point broken off will present the appearance as shown in Fig. 1, in which A is the bulb, $a$ the neck through which the air for blowing the glass is introduced and through which also the contents of the bulb may be subsequently pumped out. The point of the bulb is broken off as shown at $b$. The plug having the leading-in wires embedded in it and the filament attached thereto, is now introduced into the interior of the bulb, as shown at $c$. The tapering end of the bulb, shown at $b$, Fig. 1, is now drawn down to a narrower opening as shown at $b'$, Fig. 2, and the plug and filament being brought into this tapered end, the glass is heated and folded in upon the plug and the cement of the plug softened by heat, and stuck to the tapered bottom of the bulb, as shown at $b^3$, Fig. 3. In order to adapt the bulb now to insertion into its holder, the tapered end of the bulb is somewhat softened by heat, and the air being exhausted from the bulb through the neck $a$, the bottom of the bulb will be collapsed into it like the bottom of a champagne bottle, as shown at $b^4$ of Fig. 4. Of course, the action of the exhaust through the neck $a$ can be very much assisted by the operator pushing up this bottom. The bulb being now formed with the filament on its interior, the filament is treated therein so far as is necessary or usual, and finally the bulb is exhausted through the neck $a$, and when sufficiently exhausted, the neck $a$ is hermetically sealed by drawing under the influence of heat the neck $a$ to a collapsible condition, as shown at $a'$ of Fig. 5. This is the usual way of hermetically sealing the bulb for the incandescent lamp. This method of forming the bulb differs from the usual method from the fact that in the usual method, the bulb is made in two parts and seamed together by heat and pressure near the bottom.

The best method by which the operator can push up the bottom of the neck of the bulb, is by turning it bottom up, and softening the glass rather high up on the side of the neck so that the weight of the plug will cause it to descend into the bulb so set bottom up, carrying the edges of the bulb down with it, the operator guiding them in their descent by means of the leading-in wires that pass into the plug so as to place the filament central in the bulb.

I claim as my invention and desire to secure by Letters Patent of the United States—

1. A cement plug wire holder for incandescent lamps composed of the metallic oxides of lead, alumina and manganese, high in oxygen, and mixed, fused and blended by heat into a homogeneous cement free from silica, potash, soda of lime, substantially as and for the purpose described.

2. An insulating cement for incandescent electric lamps free of silica, potash, soda and lime, and composed of the oxides of lead, manganese, and alumina of highest oxidation combined by fusion with each other, substantially as and for the purpose described.

3. An incandescent electric lamp composed of an incomplete glass receiver A in combination with and united to the surface of an insulating plug which carries in and surrounds the leading-in and filament-carrying wires, said insulating plug being composed of a homogeneous cement of the metallic oxides of lead, manganese and alumina, comparatively high in oxygen, and intimately mingled, blended and combined together by fusion, the said incomplete glass receiver and the said insulating plug being superficially united to each other, substantially as and for the purpose described.

4. The insulating plug c composed of an unvitrified cement of the metallic oxides of manganese, lead, alumina, high in oxygen, and blended and fused together, free from silica, potash, soda and lime in combination with insulating wires embedded in the substance of the cement of said insulating plug and with the incomplete transparent glass bulb A which is superficially united to the surface of the insulating plug by fusion, substantially as and for the purpose described.

DETLEF CHRISTIAN VOSS.

Witnesses:
F. F. RAYMOND, 2d,
J. M. DOLAN.

It is hereby certified that in Letters Patent No. 521,131, granted June 5, 1894, upon the application of Detlef Christian Voss, of Boston, Massachusetts, for an improvement in "Incandescent Lamps," errors appear in the printed specification requiring the following correction, viz: In line 47, page 1, the word "of" preceding the word "soda" should read *or*, and in line 125, page 2, the word "of" preceding the word "lime" should read *or;* and that the said Letters Patent should be read with these corrections therein that the same may conform to the record of the case in the Patent Office.

Signed, countersigned, and sealed this 19th day of June, A. D. 1894.

[SEAL.]

JNO. M. REYNOLDS,
*Assistant Secretary of the Interior.*

Countersigned:
    JOHN S. SEYMOUR,
        *Commissioner of Patents.*